Sept. 25, 1928.
A. M. SCAIFE
1,685,246
CONTAINER AND METHOD OF MAKING THE SAME
Filed June 1, 1927   2 Sheets-Sheet 1
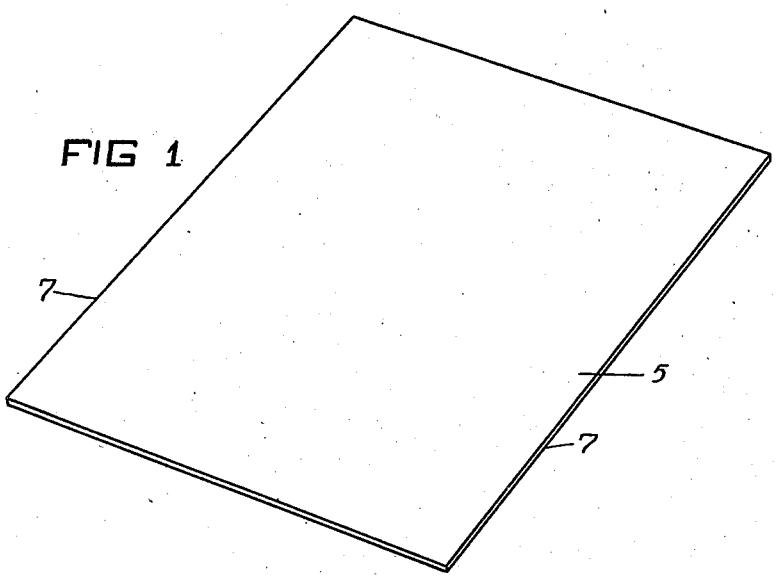
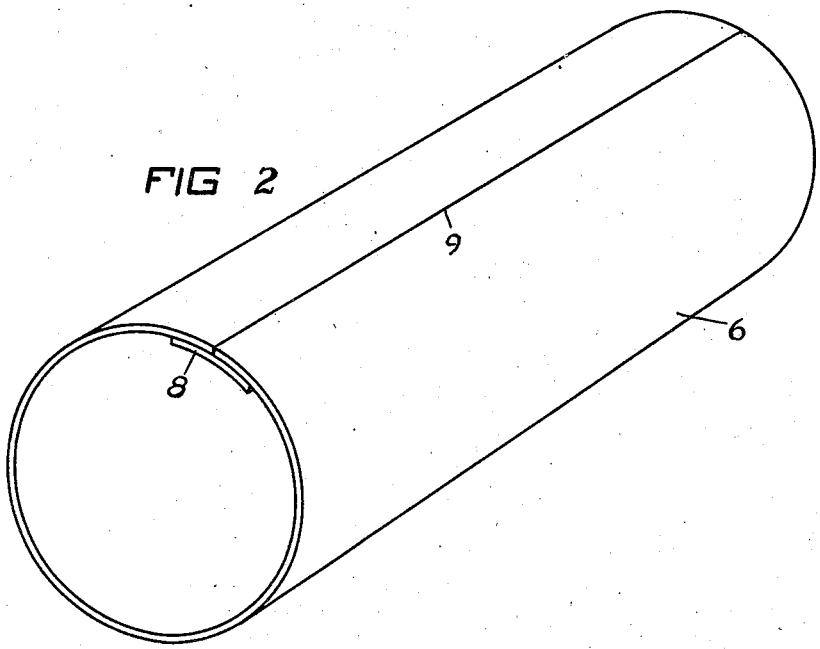
INVENTOR
Alan M. Scaife
By Green & McAllister
His Attorneys Sept. 25, 1928.                                                      1,685,246
                            A. M. SCAIFE
                 CONTAINER AND METHOD OF MAKING THE SAME
                    Filed June 1, 1927        2 Sheets-Sheet 2

INVENTOR
Alan M. Scaife
By Green & McAllister
His Attorneys

Patented Sept. 25, 1928.

1,685,246

UNITED STATES PATENT OFFICE.

ALAN M. SCAIFE, OF PITTSBURGH, PENNSYLVANIA, ASSIGNOR TO WM. B. SCAIFE & SONS COMPANY, A CORPORATION OF PENNSYLVANIA.

CONTAINER AND METHOD OF MAKING THE SAME.

Application filed June 1, 1927. Serial No. 195,645.

This invention relates to brazed tanks or containers and to methods of making the same.

Brazed containers, such, for example, as those employed for storage of liquid or gas under pressure are generally formed from a piece of flat stock which is first cut to size and then bent to tubular form. The edges, thus brought into engagement, are positioned one over the other to form a lap joint, and are temporarily held together by any desired means such, for example, as "stitch riveting", spot welding or other means. The lap joint is then brazed together on a brazing fire of suitable arrangement. The spot welding or other manner of temporarily securing the skelp edges together is merely for the purpose of holding such edges forming the longitudinal joint of the sheet in proper position with relation to each other and to prevent distortion thereof during the brazing operation, in order to provide a uniform space throughout the entire joint for receiving the brazing material. If the lapped edges were not temporarily secured together in some manner, the intense heat of the brazing fire would distort or warp these edges to such an extent as to prevent the proper fusing of the brazing material into the joint.

An object of this invention is to provide an improved longitudinal seam construction for tanks and containers, together with a method of making the same.

A further object is to provide a tank of such construction and arrangement as to eliminate the necessity of providing lap joints between the edges of the sheet.

A still further object is to provide an improved tank construction which will be attractive in appearance, rugged in construction and simple and cheap to manufacture.

Figure 3:
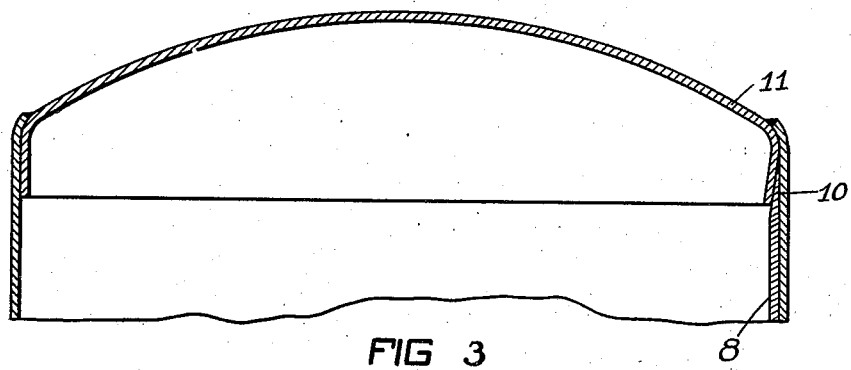
Figure 4:
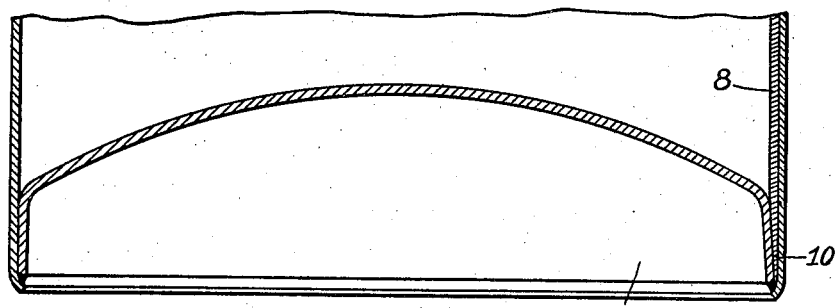

These and other objects which will be apparent to those skilled in this particular art are accomplished by means of the present invention, one embodiment of which is illustrated in the accompanying drawings, in which Figure 1 is a perspective view of a flat sheet from which a finished tank is ultimately formed. Fig. 2 is a similar view of a partially formed tank during the course of manufacture. Fig. 3 is a sectional view through one end of a finished tank provided with a convex end wall or top flange. Fig. 4 is a view similar to Fig. 3 showing a concave end wall or bottom flange, and Fig. 5 is an elevation of one end of the interior of a partially formed tank illustrating the butt joint strap member swaged out to receive an end wall.

In the particular embodiment of this invention which has been chosen for the purposes of illustration, a piece of flat stock 5 is first cut to size. This is then formed into a tubular shell having the edges 7 positioned in abutting relation. A strap member 8 is positioned along the inside of the seam 9 formed by the abutting edges 7 of the shell. Each edge is temporarily secured to the strap in any desired manner so that the parts will be effectively held in their proper relation against distortion by a brazing fire.

Figure 5:
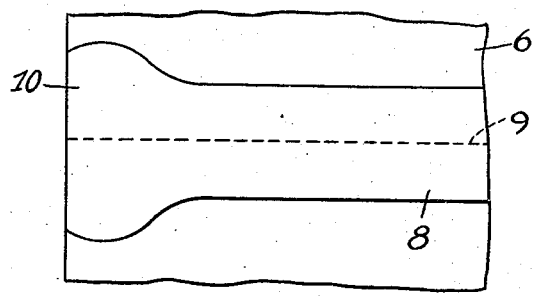

In order to provide accommodation for the end wall of the tank, and to enable the formation of a tight, smooth joint between such walls and the container proper, the ends of the strap member 8 are swaged out to form thin flattened portions 10 as shown in Figs. 3 to 5. This may be done either before or after the strap member is assembled in the tubular sheet. The parts are then subjected to a brazing operation wherein the intervening surfaces between the edges of the shell and between each edge and the strap are filled up with brazing material and the parts united to form a butt joint extending longitudinally from one end of the tank to the other. End walls, such as the concave end wall 11 or convex end wall 12 are inserted in the ends of the tank and are secured in place by brazing in the usual manner. If desired, the strap member 8 may be extended beyond the ends of the shell to assist the insertion of the end walls therein, in somewhat the manner of a shoe horn.

Attention is directed to the fact that the manufacture of a tank having a longitudinal seam formed by a butt joint provided with a longitudinally extending strap such as the strap member 8 eliminates the necessity of swaging the ends of the shell for the reception of the end walls as has heretofore been the case. The swaging of the strap member 8 alone suffices to insure a tight joint between the end walls and the tank proper and the expense of manufacture is thus considerably reduced. Also the provision of a butt joint eliminates the necessity of allowing sufficient metal to make the lap joints in cutting the original flat strip. It will be apparent that the present invention provides a tank in which all longitudinal lap joints or seams have been eliminated so that the exterior of the finished article is smooth and apparently seamless.

What I claim as new and desire to secure by Letters Patent is:

1. A tank having a longitudinally-extending seam formed by abutting edges of the tank and an interior longitudinally-extending strap member brazed to each other, the ends of said strap being swaged to form inclined faces at one side of the tank only to permit the ready insertion of the tank heads.

2. A tank having a longitudinally-extending seam formed by abutting edges of the tank and an interior longitudinally-extending strap member brazed to each other, the ends of said strap member being swaged to spread the material beyond the normal width of the strap and forming inclined surfaces to permit the ready insertion of the tank heads.

3. The method of making a cylindrical metal vessel having a longitudinal joint interiorly reinforced, consisting in cutting a sheet metal blank to bring its longitudinal edges together in abutting relationship, then inserting a reinforcing metal strip having flattened ends on said seam, said strip bridging the seam and running the full length of the vessel, initially fastening together the adjacent faces of the strip and the vessel on both sides of the seam and throughout the length of the seam in such a manner as to prevent the intense heat of the subsequent brazing operation from distorting or warping the strip, and finally brazing the parts together.

In testimony whereof, I have hereunto subscribed my name this 27th day of May, 1927.

ALAN M. SCAIFE.